United States Patent [19]

Chen

[11] Patent Number: 5,903,322
[45] Date of Patent: May 11, 1999

[54] WIRELESS VIDEO AND AUDIO TRANSMISSION DEVICE

[76] Inventor: Yao-Yin Chen, 4F, No. 56-1, Chih Hsin Erh, Chung Li City, Tao Yuan Hsien, Taiwan

[21] Appl. No.: 08/959,018

[22] Filed: Oct. 28, 1997

[51] Int. Cl.[6] .................................................. H04N 5/48
[52] U.S. Cl. .............................................. 348/723; 348/158
[58] Field of Search ................................ 348/61, 25, 152, 348/156, 552, 723, 724, 143, 13; 455/5.1, 61, 66, 42, 45, 47

[56] References Cited

U.S. PATENT DOCUMENTS

| | | | |
|---|---|---|---|
| 4,392,022 | 7/1983 | Carlson | 348/552 |
| 4,916,532 | 4/1990 | Streck et al. | 348/723 |
| 4,959,713 | 9/1990 | Morotomi et al. | 348/724 |
| 4,989,081 | 1/1991 | Miyagawa et al. | 348/61 |
| 5,202,759 | 4/1993 | Laycock | 348/152 |
| 5,283,819 | 2/1994 | Glick et al. | 348/552 |
| 5,428,388 | 6/1995 | von Bauer et al. | 348/156 |

Primary Examiner—Victor R. Kostak
Attorney, Agent, or Firm—Rosenberg, Klein & Bilker

[57] ABSTRACT

A wireless video and audio transmission device is provided that comprises a transmitter, a receiver and a TV. The transmitter has a 2.4 GHz transmission module that modulates the video signals, audio signals from a microphone that have been amplified by the amplifying circuit, and signals from a detector The transmitter transmits those signals from a 2.4 GHz transmission antenna, and after reception by the receiver, the signals will be demodulated and processed into regular A/V signals. The A/V signals are coupled to the TV, and the detected signals are coupled to a buzzer to sound an alarm. A UHF transmitter of the receiver modulates the audio signals from a microphone that have been amplified by an amplifying circuit, and transmits them from a UHF transmission antenna. After the signals have been received by a UHF reception antenna, they are transmitted to a UHF reception circuit to be demodulated, amplified and processed into regular audio signals The audio signals are output to a speaker.

2 Claims, 1 Drawing Sheet

WIRELESS VIDEO AND AUDIO TRANSMISSION DEVICE

BACKGROUND OF THE INVENTION

The subject invention relates to a wireless video transmission device, particularly to a device that will integrate the applications of radio communication, a detector and a CCD monitor camera.

Conventionally, a regular CCD monitor camera is not equipped with a radio communication transmission function, it has only a video output for monitoring, and is not equipped with a two-way audio transmission function Therefore, a device that integrates the application of radio communications, a CCD monitor camera and a detector is provided.

SUMMARY OF THE INVENTION

The primary objective of the subject invention is to present a wireless video transmission device that will, by means of radio modulation technology, transmit video and audio signals to a TV set of a receiver, and transmit the signals detected by the detector to a buzzer of the receiver to sent out an alarm sound. Meanwhile, a UHF transmitter circuit may be used to transmit the audio signals back to the transmitter Another objective of the subject invention is to present a wireless video transmission device that, by its special design, will have a night vision function to detect the occurrence of an incident (such as a fire, burglary, etc.).

To enable full understanding, the technical approach and functions to achieve the above objectives and construction are described in detail with the following drawings.

BRIEF DESCRIPTION OF NUMERALS

Figure 1:
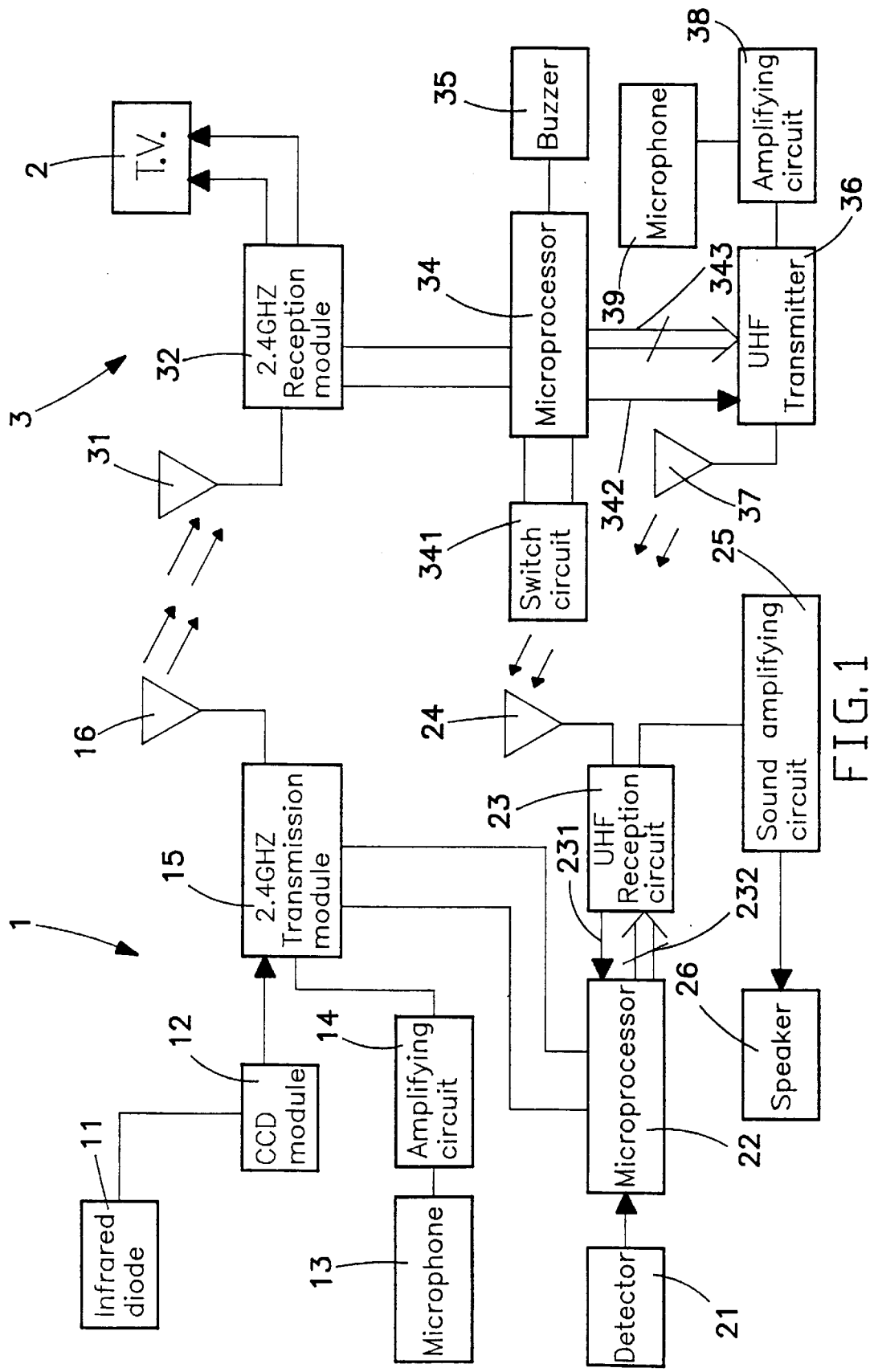
FIG. 1 is a circuit block diagram of the subject invention.

| | | | |
|---|---|---|---|
| 1 | transmitter | 2 | TV |
| 11 | infrared diode | 3 | receiver |
| 12 | CCD module | 31 | 2.4 GHz reception antenna |
| 13 | microphone | 32 | 2.4 GHz reception module |
| 14 | amplifying circuit | 34 | microprocessor |
| 15 | 2.4 GHz transmission module | 341 | switch circuit |
| 16 | 2.4 GHz transmission antenna | 342 | data line |
| 21 | detector | 343 | control line |
| 23 | UHF reception circuit | 35 | buzzer |
| 231 | data line | 36 | UHF transmitter |
| 232 | control line | 37 | UHF transmission antenna |
| 24 | UHF reception antenna | 38 | amplifying circuit |
| 25 | sound amplifying circuit | | |
| 26 | speaker | | |

DETAILED DESCRIPTION OF PREFERRED EMBODIMENT

As shown in FIG. 1, the wireless video transmission mechanism comprises a transmitter 1, a TV 2 and a receiver 3.

The transmitter 1 is composed of such components as an infrared diode 11, a CCD module 12, a microphone 13, an amplifying circuit 14, a 2.4 GHz transmission module 15, a 2.4 GHz transmission antenna 16, a detector 21, a microprocessor, a UHF reception circuit 23, a UHF reception antenna 24, a sound amplifying circuit 25 and a speaker 26. The infrared diode 11 is connected to the CCD module 12, the CCD module 12 is connected to a 2.4 GHz transmission module 15. Another input terminal of the 2.4 GHz transmission module 15 is connected to an amplifying circuit 14. An input terminal of the amplifying circuit 14 is connected to a microphone 13, while the output terminal of the 2.4 GHz transmission module is connected to a 2.4 GHz transmission antenna 16.

At a frequency of 2.4 GHz, the 2.4 GHz transmission module 15 modulates the audio signals from the microphone 13 that have been amplified by the amplifying circuit 14 and the video signals detected by the CCD module,, and transmits the modulated signals via the 2.4 GHz transmission antenna 16. The transmitted signals will be received by a receiver 3 before they are demodulated and restored to the original audio and video signals Then, the signals are transmitted to a regular monitor or TV set 2, equipped with an A/V terminal.

The 2.4 GHz transmission module 15 is connected to a microprocessor 22. The input terminal of the microprocessor 22 is connected to a detector 21, and the microprocessor 22 transmits the signals detected by the detector 21 (in events such as a fire, burglary, etc.) via the 2.4 GHz transmission module 15 and the transmission antenna 16. The output terminal of the microprocessor 22 is connected by a bus port (including a data line 231, a control line 232) to a UHF reception circuit 23. The input terminal of the UHF reception circuit 23 is connected to a UHF reception antenna 24, and the output terminal of the UHF reception circuit 23 is connected to a sound amplifying circuit 25. The output terminal of the sound amplifying circuit 25 is connected to speaker 26.

The UHF reception circuit 23 demodulates the modulated audio signals that have been received by the UHF reception antenna 24, and processes them to recover the sound signals, before they are transmitted to the sound amplifying circuit 25 for amplification. Subsequent to amplification, the audio signals are output by the speaker 26.

The receiver 3 is composed of a 2.4 GHz reception antenna 31, a 2.4 GHz reception module 32, a microprocessor 34, a buzzer 35, a UHF transmitter 36, a UHF transmission antenna 37, an amplifying circuit 38 and a microphone 39. The 2.4 GHz reception antenna is connected to the 2.4 GHz reception module 32, and the 2.4 GHz reception module 32 is connected to the microprocessor 34. An input terminal of the microprocessor 34 is connected to a switch circuit 34, and an output terminal of the microprocessor is connected to the buzzer 35.

The 2.4 GHz reception module 32 demodulates the audio and video signals received by the 2.4 GHz reception antenna 31, and restores them to the original audio and video signals, before they are transmitted to a regular television (TV) 2 that has been equipped with an A/V terminal. The 2.4 GHz reception module will demodulate the detection signals received by the 2.4 GHz reception antenna 31, before they are transmitted to the microprocessor 34 for output to the buzzer to send out an alarm signal.

Furthermore, the microprocessor is connected by a bus port (including a data line 342, and a control line 343) to the UHF transmitter 36. An input terminal of the UHF transmitter 36 is connected to the amplifying circuit 38, and an input terminal of the amplifying circuit 38 is connected to a microphone 39. An output terminal of the UHF transmitter 36 is connected to the UHF transmission antenna 37. The UHF transmitter 36 converts the audio signals that have been amplified by the amplifying circuit 38 into UHF remote control signals, for transmission from the UHF transmission antenna. Then, after the UHF reception antenna 24 of the transmitter 1 receives the signals, they are coupled to the UHF reception circuit 23 to be demodulated into regular sound signals. The sound signals are amplified by the sound amplifying circuit 25, and coupled to the speaker 26 to reproduce the sound.

Summing up, the wireless video and audio transmission mechanism, by means of radio modulation technology, will transmit video images, sound and detection signals to a receiver to display the images on a monitor and provide sound from a speaker. Meanwhile, a UHF circuit may be used to transit sound signals back to the transmitter.

The above descriptions covering a preferred embodiment of the present invention, should not be understood to limit or restrict that invention. All equivalent structural and/or configurational variations and/or modifications easily conceivable to anyone skilled in the subject art, and derived from the subject description with the drawings provided herein, should reasonably be included as being within the spirit or scope of the invention as defined in the appended claims.

I claim:

1. A wireless video and audio transmission device, comprising:

a transmitter, the transmitter including an infrared diode, the infrared diode being connected to a CCD module, the CCD module being connected to a 2.4 GHz transmission module, an input terminal of the 2.4 GHz transmission module being connected to a first amplifying circuit, an input terminal of the first amplifying circuit being connected to a first microphone, an output terminal of the 2.4 GHz transmission module being connected to a 2.4 GHz transmission antenna, and said 2.4 GHz transmission module being connected to a first microprocessor, an input terminal of the first microprocessor being connected to a detector, an output terminal of the first microprocessor being connected by a bus port to a UHF reception circuit, an input terminal of the UHF reception circuit being connected to a UHF reception antenna, an output terminal of the UHF reception circuit being connected to a sound amplifying circuit, an output terminal of the sound amplifying circuit being connected to a speaker, said transmitter using a 2.4 GHz frequency to modulate video, audio and detection signals which are then transmitted from the 2.4 GHz transmission antenna, the UHF reception circuit will demodulate and amplify audio signals, and couple the audio signals to the speaker;

a receiver, the receiver having a 2.4 GHz reception module, an input terminal of the 2.4 GHz reception module being connected to a 2.4 GHz reception antenna, said 2.4 GHz reception module being connected to a second microprocessor, an output terminal of the second microprocessor being connected to a buzzer, the second microprocessor being connected by a bus port to a UHF transmitter, an input terminal of the UHF transmitter being connected to a second amplifying circuit, an input terminal of the second amplifying circuit being connected to a second microphone, an output terminal of the UHF transmitter being connected to a UHF transmission antenna, said receiver converting audio signals to UHF remote control signals that are transmitted from the UHF transmission antenna, the 2.4 GHz reception antenna receiving modulated signals, and the 2.4 GHz reception module demodulates and processes said received signals to restore A/V signals, and detection signals the detection signals being coupled to the buzzer to sound an alarm; and an A/V component connected to an output terminal of the 2.4 GHz reception module, for display of the restored video signals.

2. The wireless video and audio transmission device as recited in claim 1, wherein the second microprocessor of the receiver is connected to a switch circuit.

* * * * *